US012696159B2

(12) United States Patent
You et al.

(10) Patent No.: US 12,696,159 B2
(45) Date of Patent: Jul. 28, 2026

(54) METHOD, DEVICE, AND SYSTEM FOR CORE NETWORK DEVICE RE-ALLOCATION IN WIRELESS NETWORK

(71) Applicant: ZTE Corporation, Shenzhen (CN)

(72) Inventors: Shilin You, Shenzhen (CN); Jiyan Cai, Shenzhen (CN); Jinguo Zhu, Shenzhen (CN); Yuze Liu, Shenzhen (CN); Jin Peng, Shenzhen (CN); Zhen Xing, Shenzhen (CN); Zhaoji Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 506 days.

(21) Appl. No.: 18/322,892

(22) Filed: May 24, 2023

(65) Prior Publication Data

US 2023/0300702 A1 Sep. 21, 2023

Related U.S. Application Data

(63) Continuation of application No. PCT/CN2021/081491, filed on Mar. 18, 2021.

(51) Int. Cl.
*H04W 36/12* (2009.01)
*H04W 8/06* (2009.01)

(52) U.S. Cl.
CPC ........... *H04W 36/12* (2013.01); *H04W 8/065* (2013.01)

(58) Field of Classification Search
CPC ..... H04W 36/12; H04W 8/065; H04W 60/04; H04W 12/08; H04W 12/06; H04W 88/14
See application file for complete search history.

(56) References Cited

U.S. PATENT DOCUMENTS

2013/0189991 A1* 7/2013 Rose ..................... H04W 92/02
455/436
2018/0227871 A1* 8/2018 Singh .................... H04W 48/18
(Continued)

FOREIGN PATENT DOCUMENTS

CN 109429295 A 3/2019
CN 109511136 A 3/2019
(Continued)

OTHER PUBLICATIONS

International Search Report in International Patent Application No. PCT/CN2021/081491 dated Nov. 18, 2021 , 3 pages.
(Continued)

*Primary Examiner* — Christine Ng
(74) *Attorney, Agent, or Firm* — Crowell & Moring LLP

(57) ABSTRACT

This disclosure generally relates performing UE authentication and registration with the core network, and in particular, to supporting secure interactions between the UE and the target AMF when the UE is re-allocated to the target AMF from an initial AMF. The Access Network element stores a candidate AMF list, and optionally, the original Registration Request message from the UE. The initial AMF, once determines an AMF re-allocation is needed, instruct the UE to re-start the registration procedure with the core network according to the stored candidate AMF list. With the solutions provided in this disclosure, the message interactions between the UE and the target AMF are integrity protected, without the need to upgrade the UE and without using an indirect connection of the core network.

9 Claims, 5 Drawing Sheets

(56)     References Cited

U.S. PATENT DOCUMENTS

| | | | | |
|---|---|---|---|---|
| 2020/0245127 A1* | 7/2020 | Zong | ................. | H04W 36/0066 |
| 2020/0280849 A1 | 9/2020 | Ito et al. | | |
| 2021/0160770 A1* | 5/2021 | Zhu | .................. | H04W 36/0033 |
| 2022/0201488 A1* | 6/2022 | Liu | ....................... | H04W 12/37 |
| 2022/0201638 A1* | 6/2022 | Arrobo Vidal | ........ | H04W 48/08 |
| 2022/0303935 A1* | 9/2022 | Olsson | ................. | H04W 12/06 |
| 2022/0322202 A1* | 10/2022 | Li | ....................... | H04L 12/1407 |
| 2022/0386229 A1* | 12/2022 | Sun | ....................... | H04W 48/18 |
| 2023/0300702 A1* | 9/2023 | You | ....................... | H04W 8/065 |
| | | | | 370/331 |
| 2024/0129731 A1* | 4/2024 | Tsiatsis | ................. | H04W 12/06 |

FOREIGN PATENT DOCUMENTS

| | | |
|---|---|---|
| CN | 111386720 A | 7/2020 |
| CN | 112087724 A | 12/2020 |
| WO | WO 2021/037604 A1 | 3/2021 |
| WO | WO 2021/045859 A1 | 3/2021 |

OTHER PUBLICATIONS

Ericsson, "AMF reallocation," 3GPP TSG-SA WG2 Meeting #136 S2-1911106, Oct. 18, 2019, 8 pages.

Extended European Search Report in European Patent Application No. 21930812.9 dated May 15, 2024, 10 pages.

Anonymous, 3rd Generation Partnership Project; Technical Specification Group Services and System Aspects; Procedures for the 5G System (SGS); Stage 2 (Release 16), 3GPP TS 23.502, V. 16.2.0, Sep. 2019, 525 pages; uploaded in two parts.

Chinese-language Office Action issued in Chinese Application No. 202180075071.6 dated Apr. 13, 2026 (10 pages).

* cited by examiner

METHOD, DEVICE, AND SYSTEM FOR CORE NETWORK DEVICE RE-ALLOCATION IN WIRELESS NETWORK

CROSS-REFERENCE TO RELATED APPLICATION

This application is a continuation application of PCT International Patent Application No. PCT/CN2021/081491, filed with the China National Intellectual Property Administration, PRC on Mar. 18, 2021, which is herein incorporated by reference in its entirety.

TECHNICAL FIELD

This disclosure is directed to terminal device authentication and authorization with a core network device in communication networks.

BACKGROUND

In a communication network, a user equipment (UE) needs to connect to a core network device such as an Access and Mobility Management Function (AMF) in order to gain services from the core network. When the UE attempts to establish a secured communication link with the core network device, the interactions including the mutual authentication between the UE and the core network device need to be ciphered and integrity protected.

SUMMARY

This disclosure relates to performing UE authentication and registration with the core network, and in particular, to supporting secure interactions between the UE and the target AMF when the UE is re-allocated to the target AMF.

In some implementations, a method for performing secure re-allocation of a User Equipment (UE) from an initial core network element to a target core network element in a communication network is disclosed. The method may be performed by an access network element and may include receiving a first message comprising a candidate core network element list from the initial core network element, the candidate core network element list comprising the target core network element; storing the candidate core network element list; and transmitting, to the initial core network element, a response message to the first message.

In some other implementations, a method for performing secure re-allocation of a UE from an initial core network element to a target core network element in a communication network is disclosed. The method may be performed by the initial core network element and may include receiving, from an access network element, a response message to a first message; and transmitting, to the UE, a second message indicative of registration with the target core network element.

In some other implementations, a device is disclosed. The device main include one or more processors, wherein the one or more processors are configured to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

Figure 1:
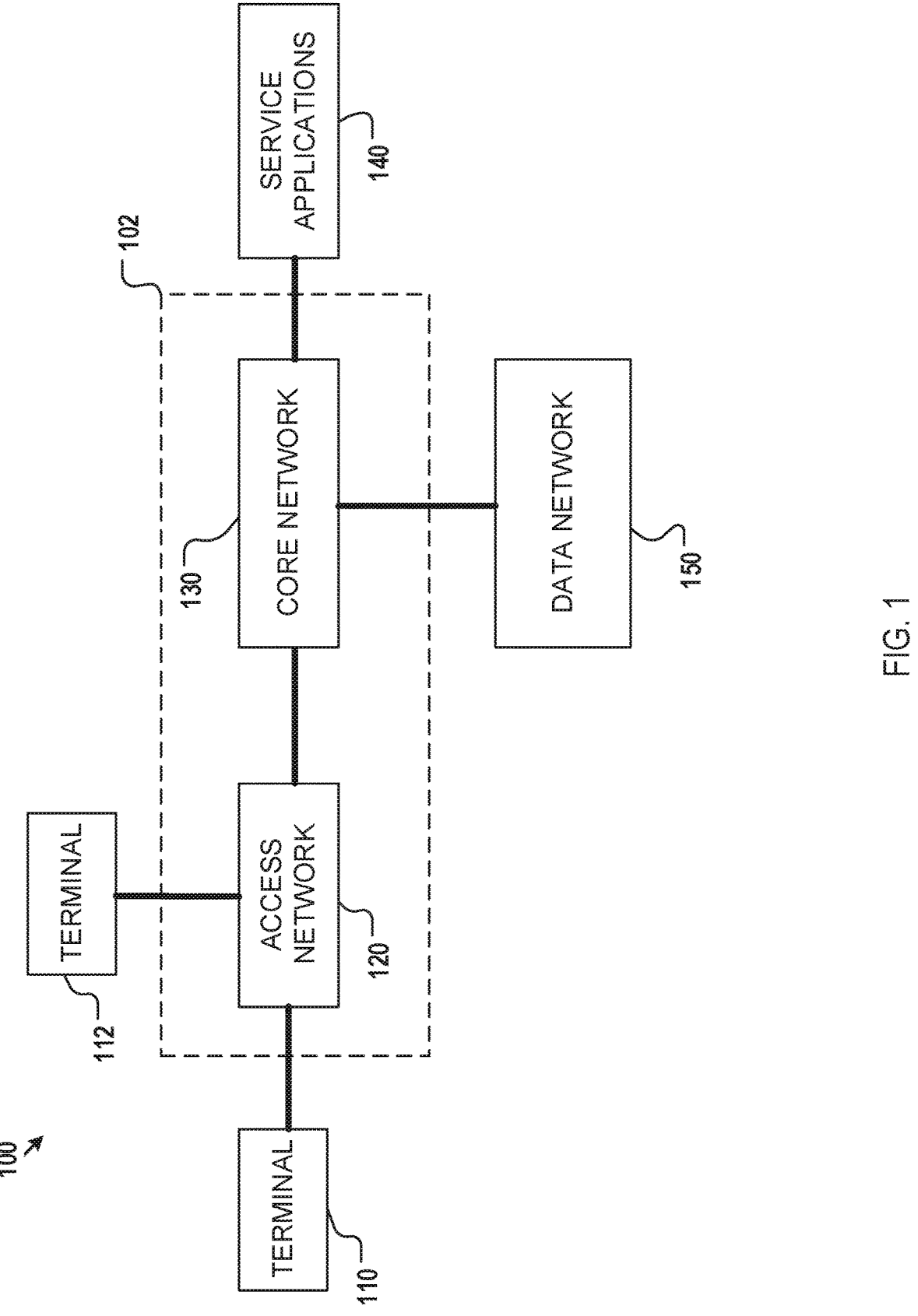
FIG. 1 shows an exemplary communication network including terminal devices, a carrier network, data network, and service applications.

An exemplary communication network, shown as 100 in FIG. 1, may include terminal devices 110 and 112, a carrier network 102, various service applications 140, and other data networks 150. The carrier network 102, for example, may include access networks 120 and a core network 130. The carrier network 102 may be configured to transmit voice, data, and other information (collectively referred to as data traffic) among terminal devices 110 and 112, between the terminal devices 110 and 112 and the service applications 140, or between the terminal devices 110 and 112 and the other data networks 150. Communication sessions and corresponding data paths may be established and configured for such data transmission. The Access networks 120 may be configured to provide terminal devices 110 and 112 network access to the core network 130. The Access network 120 may support wireless access via radio resources, or wireline access. The core network 130 may include various network nodes or network functions configured to control the communication sessions and perform network access management and data traffic routing. The service applications 140 may be hosted by various application servers that are accessible by the terminal devices 110 and 112 through the core network 130 of the carrier network 102. A service application 140 may be deployed as a data network outside of the core network 130. Likewise, the other data networks 150 may be accessible by the terminal devices 110 and 112 through the core network 130 and may appear as either data destination or data source of a particular communication session instantiated in the carrier network 102.

The core network 130 of FIG. 1 may include various network nodes or functions geographically distributed and interconnected to provide network coverage of a service region of the carrier network 102. These network nodes or functions may be implemented as dedicated hardware network elements. Alternatively, these network nodes or functions may be virtualized and implemented as virtual machines or as software entities. A network node may each be configured with one or more types of network functions. These network nodes or network functions may collectively provide the provisioning and routing functionalities of the core network 130. The term "network nodes" and "network functions" are used interchangeably in this disclosure.

Figure 2:
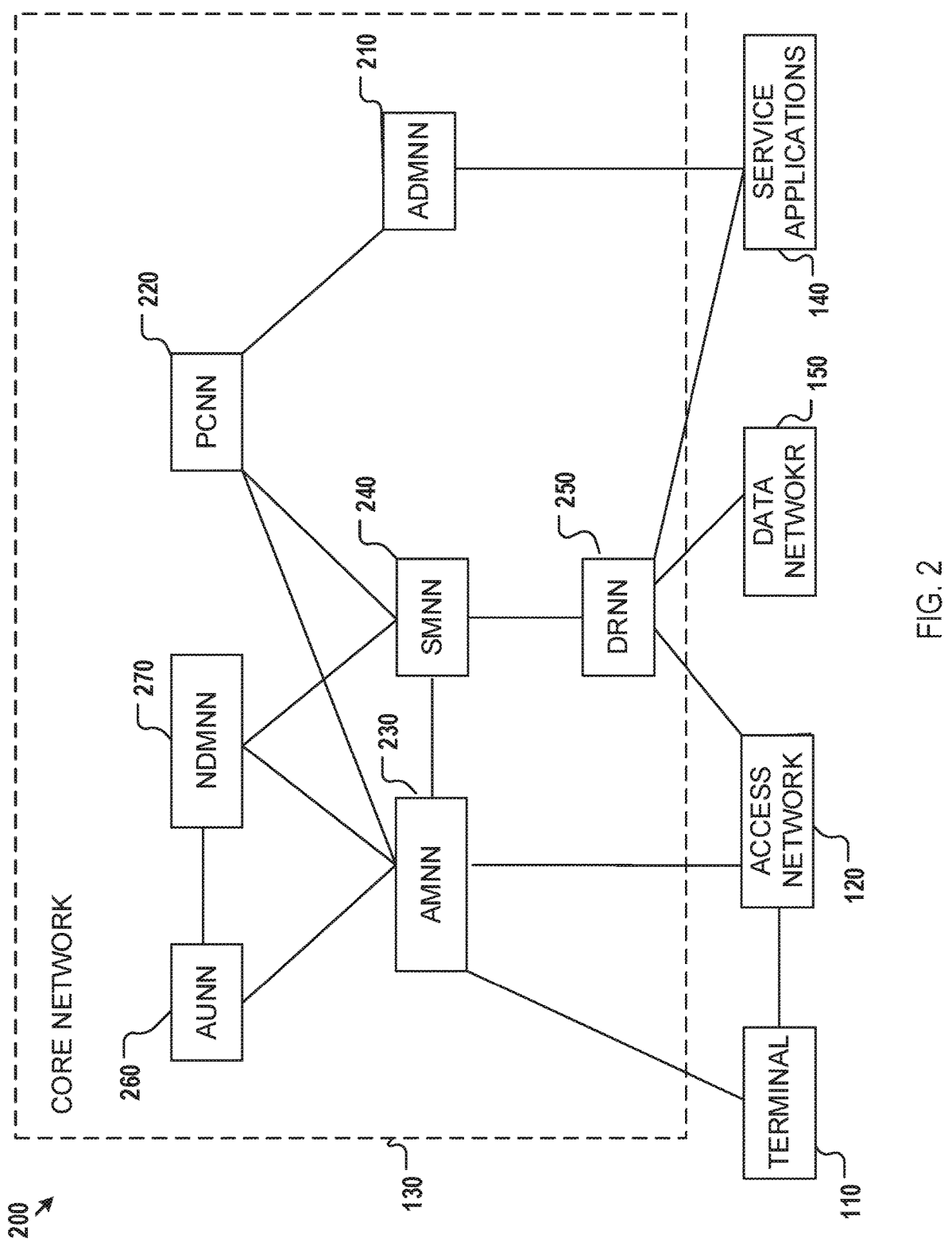
FIG. 2 shows exemplary network functions or network nodes in a communication network.

FIG. 2 further shows an exemplary division of network functions in the core network 130 of a communication network 200. While only single instances of network nodes or functions are illustrated in FIG. 2, those having ordinary skill in the art understand that each of these network nodes may be instantiated as multiple instances of network nodes that are distributed throughout the core network 130. As shown in FIG. 2, the core network 130 may include but is not limited to network nodes such as access management network node (AMNN) 230, authentication network node (AUNN) 260, network data management network node (NDMNN) 270, session management network node (SMNN) 240, data routing network node (DRNN) 250, policy control network node (PCNN) 220, and application data management network node (ADMNN) 210. Exemplary signaling and data exchange between the various types of network nodes through various communication interfaces are indicated by the various solid connection lines in FIG. 2. Such signaling and data exchange may be carried by signaling or data messages following predetermined formats or protocols.

Figure 3:
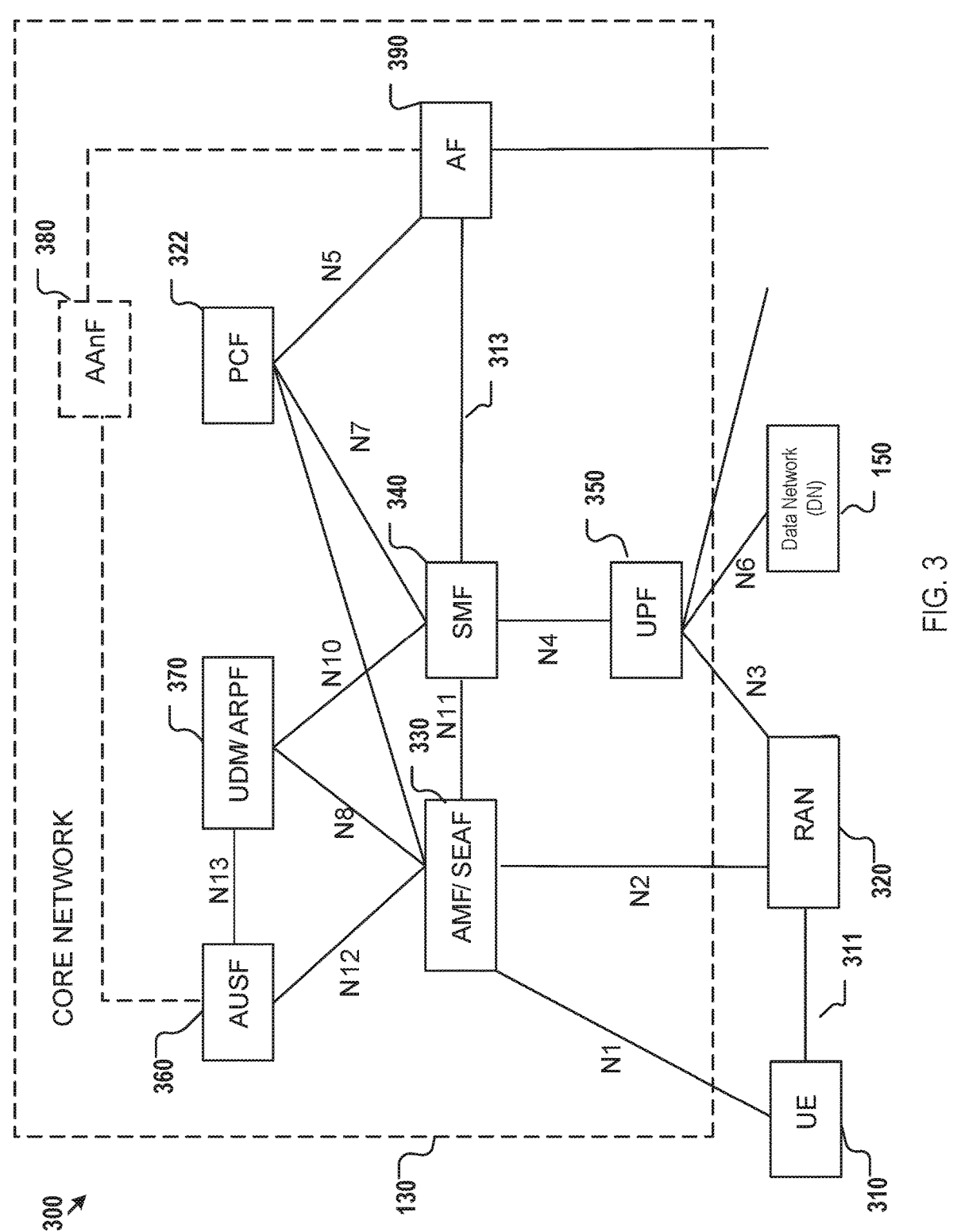
FIG. 3 shows exemplary network functions or network nodes in a wireless communication network.

The implementations described above in FIGS. 1 and 2 may be applied to both wireless and wireline communication systems. FIG. 3 illustrates an exemplary cellular wireless communication network 300 based on the general implementation of the communication network 200 of FIG. 2. FIG. 3 shows that the wireless communication network 300 may include user equipment (UE) 310 (functioning as the terminal device 110 of FIG. 2), radio access network (RAN) 320 (functioning as the access network 120 of FIG. 2), data network (DN) 150, and core network 130 including access management function (AMF) 330 (functioning as the AMNN 230 of FIG. 2), session management function (SMF) 340 (functioning as the SMNN 240 of FIG. 2), application function (AF) 390 (functioning as the ADMNN 210 of FIG. 2), user plane function (UPF) 350 (functioning as the DRNN 250 of FIG. 2), policy control function 322 (functioning as the PCNN 220 of FIG. 2), authentication server function (AUSF) 360 (functioning as the AUNN 260 of FIG. 2), and universal data management (UDM) function 370 (functioning as the UDMNN 270 of FIG. 2). Again, while only single instances for some network functions or nodes of the wireless communication network 300 (the core network 130 in particular) are illustrated in FIG. 3, those of ordinary skill in the art understand that each of these network nodes or functions may have multiple instances that are distributed throughout the wireless communication network 300.

In FIG. 3, the UE 310 may be implemented as various types of mobile devices that are configured to access the core network 130 via the RAN 320. The UE 310 may include but is not limited to mobile phones, laptop computers, tablets, Internet-Of-Things (IoT) devices, distributed sensor network nodes, wearable devices, and the like. The UE may also be Multi-access Edge Computing (MEC) capable UE that supports edge computing. The RAN 320 for example, may include a plurality of radio base stations distributed throughout the service areas of the carrier network. The communication between the UE 310 and the RAN 320 may be carried in over-the-air (OTA) radio interfaces as indicated by 311 in FIG. 3.

Continuing with FIG. 3, the UDM 370 may form a permanent storage or database for user contract and subscription data. The UDM may further include an authentication credential repository and processing function (ARPF, as indicated in 370 of FIG. 3) for storage of long-term security credentials for user authentication, and for using such long-term security credentials as input to perform computation of encryption keys as described in more detail below. To prevent unauthorized exposure of UDM/ARPF data, the UDM/ARPF 370 may be located in a secure network environment of a network operator or a third-party.

The AMF/SEAF 330 may communicate with the RAN 320, the SMF 340, the AUSF 360, the UDM/ARPF 370, and the PCF 322 via communication interfaces indicated by the various solid lines connecting these network nodes or functions. The AMF/SEAF 330 may be responsible for UE to non-access stratum (NAS) signaling management, and for provisioning registration and access of the UE 310 to the core network 130 as well as allocation of SMF 340 to support communication need of a particular UE. The AMF/SEAF 330 may be further responsible for UE mobility management. The AMF may also include a security anchor function (SEAF, as indicated in 330 of FIG. 3) that, as described in more detail below, and interacts with AUSF 360 and UE 310 for user authentication and management of various levels of encryption/decryption keys. The AUSF 360 may terminate user registration/authentication/key generation requests from the AMF/SEAF 330 and interact with the UDM/ARPF 370 for completing such user registration/authentication/key generation.

The SMF 340 may be allocated by the AMF/SEAF 330 for a particular communication session instantiated in the wireless communication network 300. The SMF 340 may be responsible for allocating UPF 350 to support the communication session and data flows therein in a user data plane and for provisioning/regulating the allocated UPF 350 (e.g., for formulating packet detection and forwarding rules for the allocated UPF 350). Alternative to being allocated by the SMF 340, the UPF 350 may be allocated by the AMF/SEAF 330 for the particular communication session and data flows. The UPF 350 allocated and provisioned by the SMF 340 and AMF/SEAF 330 may be responsible for data routing and forwarding and for reporting network usage by the particular communication session. For example, the UPF 350 may be responsible for routing end-end data flows between UE 310 and the DN 150, between UE 310 and the service applications 140. The DN 150 and the service applications 140 may include but are not limited to data network and services provided by the operator of the wireless communication network 300 or by third-party data network and service providers.

The PCF 322 may be responsible for managing and providing various levels of policies and rules applicable to a communication session associated with the UE 310 to the AMF/SEAF 330 and SMF 340. As such, the AMF/SEAF 330, for example, may assign SMF 340 for the communication session according to policies and rules associated with the UE 310 and obtained from the PCF 322. Likewise, the SMF 340 may allocate UPF 350 to handle data routing and forwarding of the communication session according to policies and rules obtained from the PCF 322.

While FIGS. 1-3 and the various exemplary implementations described below are based on cellular wireless communication networks, the scope of this disclosure is not so limited and the underlying principles are applicable to other types of wireless and wireline communication networks.

Network identity and data security in the wireless communication network 300 of FIG. 3 may be managed via user authentication processes provided by the AMF/SEAF 330, the AUSF 360, and the UDM/ARPF 370. In particularly, the UE 310 may first communicate with AMF/SEAF 330 for network registration and may then be authenticated by the AUSF 360 according to user contract and subscription data in the UDM/ARPF 370. Communication sessions established for the UE 310 after user authentication to the wireless communication network 300 may then be protected by the various levels of encryption/decryption keys. The generation and management of the various keys may be orchestrated by the AUSF 360 and other network functions in the communication network.

In a communication network, one of a critical feature is network slicing. The network slicing feature enables the multiplexing of virtualized and independent logical networks on the same physical network infrastructure. Each logical network, also referred to as a network slice, may be an isolated end-to-end network customized to serve a particular application with a corresponding service level requirement. The network slices may be provided by different vendors. For example, a cloud computing vendor may provide a network slice to serve a UE's computing requirement; a media company may provide a network slice to support real time video streaming service. From one aspect of security requirement, the network slices need to be isolated and interactions between network slices, either direct or indirect, need to be reduced or eliminated.

A UE (or a subscriber) may subscribe to one or more network slices with a service operator. For example, an Internet-of-Things (IoT) UE may subscribe to a network slice supporting very low throughput yet a large number of devices; a UE configured for vehicular communication may subscribe to a network slice supporting data transmission with very low latency and ultra-reliability. When the UE sets up a connection with a (Radio) Access Network ((R)AN) element, such as a gNodeB (gNB), the UE requests one or more subscribed network slices during the registration procedure. Using the gNB as an example, the gNB selects an initial AMF to support the UE. The initial AMF queries the UDM to retrieve the network slices subscribed by the UE. The initial AMF may further determine that the allowed network slices for the UE in the current registration area. If the initial AMF itself does not support all the network slices requested by the UE, then it may seek help from the Network Slice Selection Function (NSSF) to choose another suitable AMF, also referred to as a target AMF, which may meet the UE's network slices subscription. The NSSF provides one or more allowed network slices for the device and works with the NRF to determine the candidate AMF list. The NSSF then responses back with a list of candidate AMFs to the initial AMF. The initial AMF selects a target AMF from the candidate AMF list and instructs the UE to re-start the registration procedure and register with the target AMF.

As described above, during the UE registration procedure, the UE is initially assigned to the initial AMF and is re-allocated (or redirected) to the target AMF. When the UE registers with AMF, the message exchanges need to be integrity protected. In doing so, a security key, namely the key AMF ($K_{AMF}$), is used and shared between the UE and the AMF. When the UE performs initial registration with the initial AMF, the integrity of message exchanges are protected and a secure communication link between the UE and the initial AMF is established. However, in the case the UE needs to be re-allocated to the target AMF, the $K_{AMF}$ on the target AMF side, and the $K_{AMF}$ on the UE side, may become inconsistent. The previously established secure communication link between the UE and the initial AMF may no longer work for the UE and the target AMF. As such, either 1). The message exchanges between the UE and the target AMF need to be transmitted without integrity protection; or 2). The message exchanges need to be routed through or with the help of a connected core network element (i.e., an indirect connection is used). In supporting 1), the UE needs to be upgraded, through software, hardware, or both, to support authentication message without integrity protection.

In supporting 2), using an indirect connection of the core network is against the isolation requirement of the core network.

In this disclosure, various embodiments are disclosed aiming at solving the aforementioned issues. The embodiments do not require a UE upgrade and support complete physical isolation of the core network.

UE Re-Allocation to Target AMF (Embodiment 1)

Figure 4:
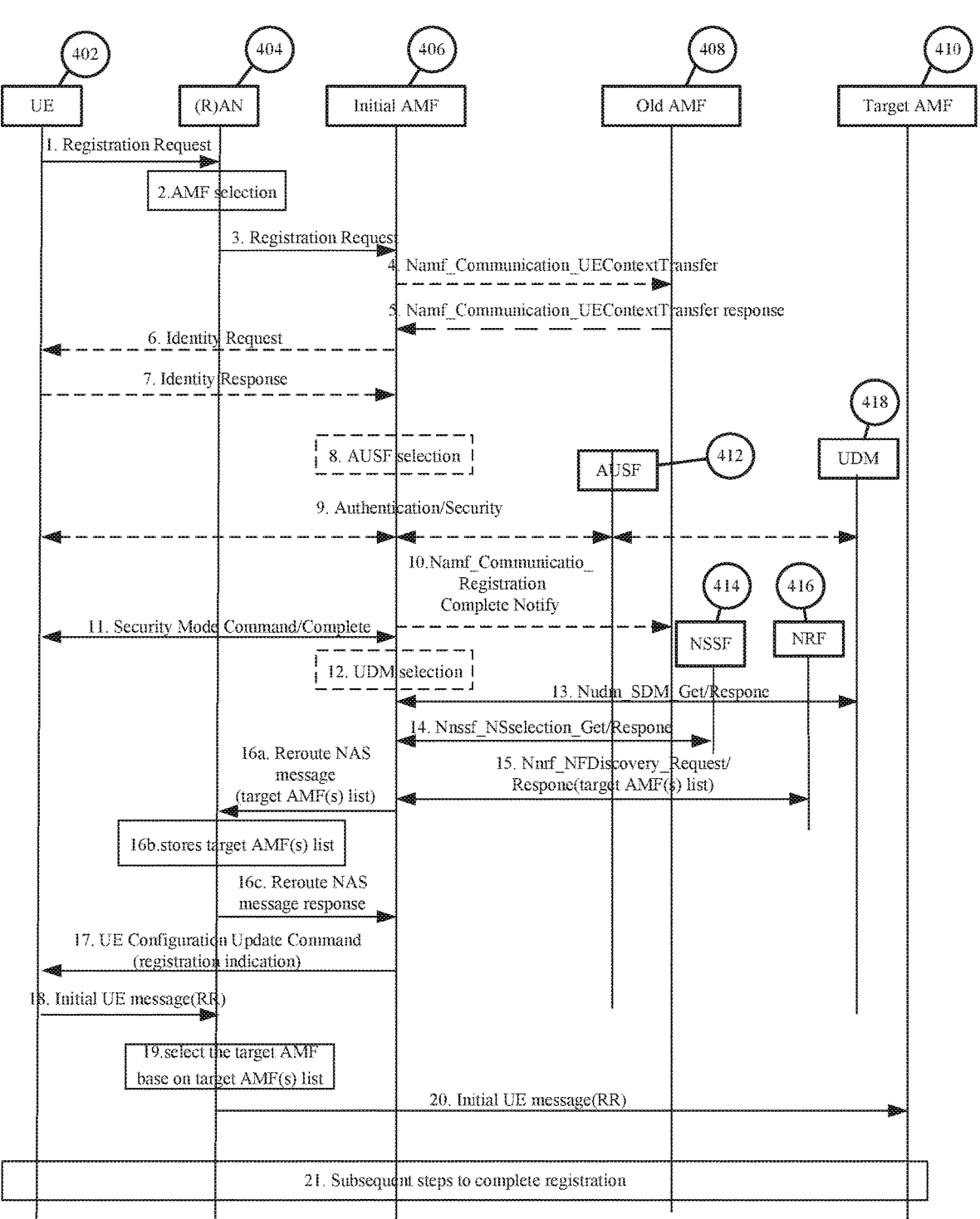
FIG. 4 shows an exemplary logic flow for UE re-allocation from an initial AMF to a target AMF.

FIG. 4 shows exemplary logic flows for performing secure re-allocation of the UE to the target AMF. The specific exemplary steps are illustrated by steps 1 to 21 in FIG. 4. Various embodiments may include any portion or all of the steps.

As shown in FIG. 4, a UE 402 initiates an initial Registration Request with a (Radio) Access Network ((R)AN) 404. The UE may subscribe to various network functions, or various network slices. The (R)AN may include a Radio Access Network, such as a gNB, an ENB, or a NodeB. The (R)AN may also include wireline Access Network. The (R)AN selects an initial AMF 406 and forward the Registration Request to it. The initial AMF may authenticate the UE and establish a secure connection with the UE. The initial AMF may further retrieve the UE's subscription information on network functions and/or network slices. In the case that the initial AMF not being able to support the UE in term of UE's subscription requirement, the initial AMF may retrieve a candidate AMF list by interacting with the other core network elements such as Network Slice Selection Function (NSSF) 414, Network Repository Function (NRF) 416, etc. The initial AMF then forward the candidate AMF list to the (R)AN. A new Registration Request may be triggered, and the UE registers with the target AMF 410 based on the new Registration Request.

These steps are described in details below.

Step 1

The UE sends (e.g., transmits, delivers) an Access Network (AN) message to the (R)AN (e.g., a gNB, an eNB). In some embodiments, the AN message may include one or more of: AN parameters, a Registration Request (also referred to herein as, Registration Request message, or RR message), a UE Policy Container. The Registration Request may include a Registration type, a device identifier associated with UE, (e.g., Subscription Concealed Identifier (SUCI), 5G NR Global Unique Temporary Identifier (5G-GUTI), Permanent Equipment Identifier (PEI), or the like), last visited Tracking Area identity (TAI), Security parameters, Requested Network Slice Selection Assistance Information (NSSAI), [Mapping Of Requested NSSAI], Default Configured NSSAI Indication, UE Radio Capability Update, UE Mobility Management (MM) Core Network Capability, Protocol Data Unit (PDU) Session status, List Of PDU Sessions To Be Activated, Follow-on request, Mobile Initiated Connection Only (MICO) mode preference, Requested Discontinuous Reception Mode (DRX) parameters, [LADN DNN(s) or Indicator Of Requesting LADN Information], and/or [NAS message container]. In some embodiments, the AN message may include the list of PDU Session Identities (PSIs) and/or an indication of UE support for Access Network Discovery & Selection Policy (ANDSP) and the operating system identifier.

In the case the AN is a Next Generation (R)AN (NG-(R) AN), the AN parameters may further include 5G Shortened Temporary Mobile Subscription Identifier (5G-S-TMSI) or Global Unique AMF Identifier (GUAMI), the Selected Public Land Mobile Network (PLMN) ID and Requested NSSAI, the AN parameters also include Establishment cause. The Establishment cause provides the reason for requesting the establishment of a Radio Resource Control (RRC) connection. Whether and how the UE includes the Requested NSSAI as part of the AN parameters is dependent on the value of the Access Stratum Connection Establishment NSSAI Inclusion Mode parameter.

The Registration type indicates if the UE wants to perform an Initial Registration (i.e., the UE is in Registration Management De-registered (RM-DEREGISTERED) state), a Mobility Registration Update (i.e., the UE is in Registration Management Registered (RM-REGISTERED) state and initiates a Registration procedure due to mobility or due to the UE needs to update its capabilities or protocol parameters, or to request a change of the set of network slices it is allowed to use), a Periodic Registration Update (i.e., the UE is in RM-REGISTERED state and initiates a Registration procedure due to the Periodic Registration Update timer expiry) or an Emergency Registration (i.e., the UE is in limited service state).

When the UE performs an Initial Registration, the UE indicates its UE identity in the Registration Request message using one of:

a) a native 5G-GUTI assigned by the which the UE is attempting to register;

b) a native 5G-GUTI assigned by an equivalent PLMN to the PLMN to which the UE is attempting to register;

c) a native 5G-GUTI assigned by any other PLMN;

d) a 5G-GUTI assigned via another access type; or e) a SUCI.

The NAS message container may be included if the UE is sending a Registration Request message as an Initial NAS message and the UE has a valid 5G NAS security context and the UE needs to send non-cleartext IEs. If the UE does not need to send non-cleartext IEs, the UE may send a Registration Request message without including the NAS message container.

When the UE is performing an Initial Registration (i.e., the UE is in RM-DEREGISTERED state) with a native 5G-GUTI then the UE may indicate the related GUAMI information in the AN parameters. When the UE is performing an Initial Registration with its SUCI, the UE may not indicate any GUAMI information in the AN parameters.

For an Emergency Registration, the SUCI may be included if the UE does not have a valid 5G-GUTI available; the PEI may be included when the UE has no SUPI and no valid 5G-GUTI. In some embodiments, the 5G-GUTI is included and it indicates the last serving AMF (also referred to as Old AMF 408 in FIG. 4).

The UE includes the Default Configured NSSAI Indication if the UE is using a Default Configured NSSAI.

In the case of Mobility Registration Update, the UE includes the PDU sessions for which there are pending uplink data in a PDU session list (e.g., List of PDU Sessions To Be Activated). The UE may include always-on PDU sessions which are accepted by the network in the PDU sessions list even if there is no pending uplink data for those PDU sessions.

The UE MM Core Network Capability may be provided by the UE and may be handled by AMF. The UE includes in the UE MM Core Network Capability an indication if it supports Request Type flag "handover" for PDN connectivity request during the attach procedure.

In some embodiments, the last visited TAI may be included in order to help the AMF produce Registration Area for the UE.

The Security parameters are used for Authentication and integrity protection. The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE.

The Follow-on request may be included when the UE has pending uplink signaling, or the Registration type indicates the UE wants to perform an Emergency Registration.

Step 2

Upon receiving the AN message with the Registration Request from the UE, the (R)AN selects an AMF based on the AN message. The selected AMF is referred to as the initial AMF 406 as shown in FIG. 4. If a 5G-S-TMSI or GUAMI is not included in the AN message, or the 5G-S-TMSI or GUAMI does not indicate a valid AMF, the (R)AN selects an AMF based on (Radio) Access Type ((R))AT) and/or Requested NSSAI.

If the UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured in the (R)AN, to perform AMF selection.

Step 3

The (R)AN sends (i.e., transmits, delivers) the registration request to the initial AMF via, for example, an N2 message. The N2 message may further include N2 parameters.

When NG-(R)AN is used, the N2 parameters may include the Selected PLMN ID, Location Information and Cell Identity related to the cell in which the UE is camping, UE Context Request which indicates that a UE context including security information needs to be setup at the NG-(R)AN. The N2 parameters may also include the Establishment cause.

Step 4

The initial AMF sends to the old AMF 408 a Namf_Communication_UEContextTransfer (complete Registration Request) message and/or the initial AMF sends to the Unstructured Data Storage Function (UDSF) (not shown in FIG. 4) a Nudsf_Unstructured Data Management Query message. The old AMF may include the last AMF serves the UE.

In the case with UDSF Deployment, if the UE's 5G-GUTI was included in the Registration Request (as in step 1 and step 3), and the serving AMF has changed since last Registration procedure of the UE, if the initial AMF and old AMF are in the same AMF Set and UDSF is deployed, the initial AMF may retrieve the SUPI and UE context of the UE directly from the UDSF using Nudsf_UnstructuredDataManagement_Query service operation. Alternatively, the initial AMF and the old AMF may share UE context.

In the case without UDSF Deployment, if the UE's 5G-GUTI is included in the registration request and the serving AMF has changed since last Registration procedure, the initial AMF may invoke the Namf_Communication_UEContextTransfer service operation on the old AMF including the complete Registration Request NAS message, which may be integrity protected, as well as the Access Type, to request the UE's SUPI and UE Context. In this case, the old AMF uses either 5G-GUTI and the integrity protected complete Registration request NAS message, or the SUPI and an indication that the UE is validated from the initial AMF, to verify integrity protection if the context transfer service operation invocation corresponds to the UE requested. The old AMF may also transfer the event subscriptions information by each Network Function (NF) consumer, for the UE, to the initial AMF.

If the old AMF has PDU Sessions for another access type (e.g., different from the Access Type indicated in this step) and if the old AMF determines that there is no possibility for relocating the N2 interface to the initial AMF, the old AMF returns UE's SUPI and indicates that the Registration Request has been validated for integrity protection, but does not include the rest of the UE context.

Step 5

The old AMF sends to the initial AMF a response to the Namf_Communication_UEContextTransfer and/or the UDSF (not shown in FIG. 4) sends to the initial AMF a response to the Nudsf_Unstructured Data Management Query. In some embodiments, the Namf_Communication_UEContextTransfer may include a SUPI and/or UE Context in the old AMF.

If the UDSF was queried in step 4 in FIG. 4, the UDSF responds to the initial AMF for the Nudsf_Unstructured Data Management Query invocation with the related contexts including established PDU Sessions. If the old AMF was queried in step 4 in FIG. 4, old AMF responds to the initial AMF for the Namf_Communication_UEContextTransfer invocation by including the UE's SUPI and UE Context.

If the old AMF holds information about established PDU Session(s), the old AMF includes Session Management Function (SMF) information, Data Network Name (DNN), Single-NSSAI (S-NSSAI) and PDU Session ID(s) in the response message.

If the old AMF holds UE context established via Non-3GPP InterWorking Function (N3IWF), the old AMF includes the Connection Management (CM) state for UE connected via N3IWF. If the UE is in CM-CONNECTED state via N3IWF, the old AMF includes information about the Next Generation Application Protocol (NGAP) UE Transport Network Layer Association (UE-TNLA) bindings.

If the old AMF fails the integrity check of the Registration Request, the old AMF may indicate the integrity check failure.

Step 6

The initial AMF sends to the UE an Identity Request message. This message may be used for requesting the SUCI of the UE.

Step 7

The UE sends to the initial AMF an Identity Response message. The Identity Response message may include the SUCI. The UE may derive (e.g., calculate, generate, etc.) the SUCI by using the provisioned public key of the Home PLMN (HPLMN).

Step 8

The initial AMF may decide to initiate UE authentication by invoking an AUSF 412, which may be selected based on SUPI or SUCI of the UE.

Step 9

As shown in FIG. 4, step 9 may include authentication interactions between various network elements including interaction between the initial AMF and the AUSF, interaction between the AUSF and the UDM 418, and interaction between the initial AMF and the UE.

Specifically, the initial AMF may perform the authentication request with the AUSF. The AUSF may retrieve authentication data from the UDM to facilitate the authentication request. Once the UE has been authenticated by the AUSF, the AUSF provides relevant security related information to the initial AMF and indicates to the initial AMF that the authentication is successful. In case the initial AMF provides a SUCI to the AUSF, the AUSF may return the SUPI to the initial AMF only after the authentication is successful.

After successful authentication in the initial AMF, which may be triggered by the integrity check failure in the old AMF at step 5 in FIG. 4, the initial AMF may invoke step 4 in FIG. 4 again and indicates that the UE is validated, for example, through the reason parameter in the Namf_Communication_UEContextTransfer message.

If NAS security context does not exist, the NAS security initiation is performed. In some embodiments, for example, the NAS security mode command procedure may be used. If the UE had no NAS security context in step 1 in FIG. 4, the UE includes the full Registration Request message (or referred to as complete Registration Request, entire Registration Request). In the full Registration Request, the UE may send to the initial AMF its capability related parameters, such as network slicing related information, in the full Registration Request message.

The initial AMF may also initiate NGAP procedure to provide the (R)AN with security context. The (R)AN stores the security context and acknowledges to the initial AMF. The (R)AN may use the security context to protect the subsequent messages exchanged with the UE.

Step 10

The initial AMF notifies the old AMF that the registration of the UE in the initial AMF is completed by invoking the Namf_Communication_RegistrationCompleteNotify service operation.

If the authentication/security procedure fails, then the Registration shall be rejected, and the initial AMF invokes the Namf_Communication_RegistrationCompleteNotify service operation with a reject indication reason code towards the old AMF.

If one or more of the S-NSSAIs used in the old Registration Area cannot be served in the target Registration Area, the initial AMF determines which PDU Session cannot be supported in the new Registration Area. The initial AMF may invoke the Namf_Communication_RegistrationCompleteNotify service operation including the rejected PDU Session ID and a reject cause (e.g., the S-NSSAI becomes no longer available) towards the old AMF. Then the new AMF modifies the PDU Session Status correspondingly. The old AMF may inform the corresponding SMF(s) to locally release the UE's Session Management (SM) context by invoking the Nsmf_PDUSession_ReleaseSMContext service operation.

Step 11

The initial AMF sends the NAS Security Mode Command (SMC) to the UE. The UE replies with NAS Security Mode Complete message containing a complete Registration Request message.

Step 12

The initial AMF may need UE's subscription information to decide whether to reroute the Registration Request. If UE's network slice selection subscription information was not provided by the old AMF, the AMF selects a UDM in order to retrieve the UE's slice selection subscription information from the UDM.

Step 13

The initial AMF may initiate the Nudm_SDM_Get procedure with the UDM 418.

In some embodiments, the initial AMF sends an Nudm_SDM_Get message to the UDM to request UE's Slice Selection Subscription data. The Nudm_SDM_Get message may include the SUPI of the UE. The UDM may get UE's Slice Selection Subscription data from Unified Data Repository (UDR) by Nudr_DM_Query. In some embodiments, the Nudr_DM_Query may include the SUPI of the UE.

In some embodiments, the UDM sends a Response to Nudm_SDM_Get to the initial AMF. The initial AMF gets the Slice Selection Subscription data including Subscribed S-NSSAIs. The UDM may provide indication that the subscription data for network slicing is updated for the UE.

Step 14

The initial AMF may initiate the Nnssf_NSSelection_Get procedure with the Network Slice Selection Function (NSSF) 414.

In some embodiments, the initial AMF sends to the NSSF a Nnssf_NSSelection_Get message. The Nnssf_NSSelection_Get message may include a Requested NSSAI, a [Mapping Of Requested NSSAI], a Subscribed S-NSSAI(s) with the default S-NSSAI indication, a TAI, an Allowed NSSAI for the other access type (if any), a [Mapping of Allowed NSSAI], and/or PLMN ID of the SUPI).

It is possible that the initial AMF may not be capable of serving all the S-NSSAI(s) from the Requested NSSAI permitted by the subscription information. In this case, there is a need for slice selection. The initial AMF invokes the Nnssf_NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE.

In some embodiments, the NSSF sends to the initial AMF a Response to Nnssf_NSSelection_Get. In some embodiments, the Response may include AMF Set or list of AMF addresses, Allowed NSSAI for the first access type, [Mapping Of Allowed NSSAI], [Allowed NSSAI for the second access type], [Mapping of Allowed NSSAI], [Network Slice Instance (NSI) ID(s)], [Network Repository Functions (NRFs)], [List of rejected (S-NSSAI(s), cause value(s))], [Configured NSSAI for the Serving PLMN], and/or [Mapping Of Configured NSSAI]).

In some embodiments, the NSSF returns to the initial AMF the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF may return NSI ID(s) associated with the Network Slice instance(s) corresponding to certain S-NSSAI(s). The NSSF may return the NRF(s) (e.g., NRF 416 in FIG. 4) to be used to select NFs/services within the selected Network Slice instance(s). It may return also information regarding rejection causes for S-NSSAI(s) not included in the Allowed NSSAI. The NSSF may return Configured NSSAI for the Serving PLMN, and possibly the associated mapping of the Configured NSSAI.

Step 15

The initial AMF may initiate the Nnrf_NFDiscovery procedure with the NRF. For example, in the situation that the initial AMF does not support at least one of the Network Slices (or Network Functions) subscribed by the UE, the initial AMF needs to retrieve a list of target AMFs (also referred to as candidate AMFs in this disclosure) which may support the Network Slices (or Network Functions) subscribed by the UE.

In some embodiments, the initial AMF sends to the Network Repository Function (NRF) 416 an Nnrf_NFDiscovery_Request. The Nnrf_NFDiscovery_Request may include a NF type and/or an AMF set.

In some embodiments, if the initial AMF does not locally store a target AMF address, and if the initial AMF intends to use direct reroute to the target AMF, or the reroute via (NG-R)AN message needs to include AMF address, then the initial AMF invokes the Nnrf_NFDiscovery_Request service operation from the NRF to find a proper target AMF which has required NF capabilities to serve the UE. The NF type may be set to AMF. The AMF Set is included in the Nnrf_NFDiscovery_Request.

In some embodiments, the NRF sends to the AMF a response to Nnrf_NFDiscovery_Request. The response to Nnrf_NFDiscovery_Request may include a list of AMF pointer, a list of AMF address, and/or additional selection rules and NF capabilities.

The NRF replies with a candidate AMF list. The NRF may also provide the details of the services offered by, as well as capabilities of each of the candidate AMF in the list. The NRF may additional reply back selection rules for selecting target AMF. Based on the information about registered NFs and required capabilities, a target AMF may be selected by the initial AMF from the candidate AMF list.

If the initial AMF is not part of the target AMF set, and is not able to get a candidate AMF list by querying the NRF with the target AMF set (e.g., the NRF locally pre-configured on AMF does not provide the requested information, the query to the appropriate NRF provided by the NSSF is not successful, or the initial AMF has knowledge that the initial AMF is not authorized as serving AMF etc.), then the initial AMF forwards the NAS message to the target AMF via (R)AN executing; the Allowed NSSAI and the target AMF Set (or the candidate AMF list) are included to enable the (R)AN to select the target AMF.

Step 16a

The initial AMF, based on local policy and UE subscription information, decides to forward the NAS message to the target AMF via (R)AN. The initial AMF sends a Reroute NAS message to the (R)AN. The Reroute NAS message may include the candidate AMF list. The Reroute NAS message may further include the information about the target AMF. In some embodiments, if step 1 of FIG. 4 has NAS security protection, the Reroute NAS message may include the Registration Request message sent from the UE in step 1 of FIG. 4. In some embodiments, if step 1 of FIG. 4 does not have NAS security protection, the Reroute NAS message may include the full Registration Request message sent from the UE to the AMF in step 9 of FIG. 4.

Step 16b

The (R)AN stores the candidate AMF list. The stored candidate AMF list may be referenced when the (R)AN processes subsequent incoming messages, which may include messages sent from the UE.

Step 16c

The (R)AN sends Reroute NAS message Response to the initial AMF.

Step 17

The initial AMF sends a message to the UE with registration indication for requesting the UE to start a registration procedure. The message may include a UE Configuration Update Command message, a Registration Accept message with registration indication, or a Registration reject message. There is no limitation in this disclosure on what type of message may be used to request the UE to start the registration procedure.

Step 18

Triggered by the message sent in step 17, The UE initiates a new Registration procedure, for example, by sending an Initial UE message with a new Registration Request to the (R)AN.

Step 19

The (R)AN selects the target AMF 410 base on the candidate AMF list that the (R)AN stores in step 16b. In some embodiments, the selection may be based on pre-defined rules, for example, connectivity to the candidate AMF may be considered. The selection may also be based on capability of the candidate AMF. There is no limitation in this disclosure on how the target AMF is selected in this disclosure.

Step 20

The (R)AN sends the initial UE message to the target AMF. The initial UE message is based on the new Registration Request received from the UE in step 18.

Step 21

After receiving the Registration Request message trans-mitted, the target AMF and the UE continue with the subsequent Registration procedure and complete the regis-tration.

UE Re-Allocation to Target AMF (Embodiment 2)

Figure 5:
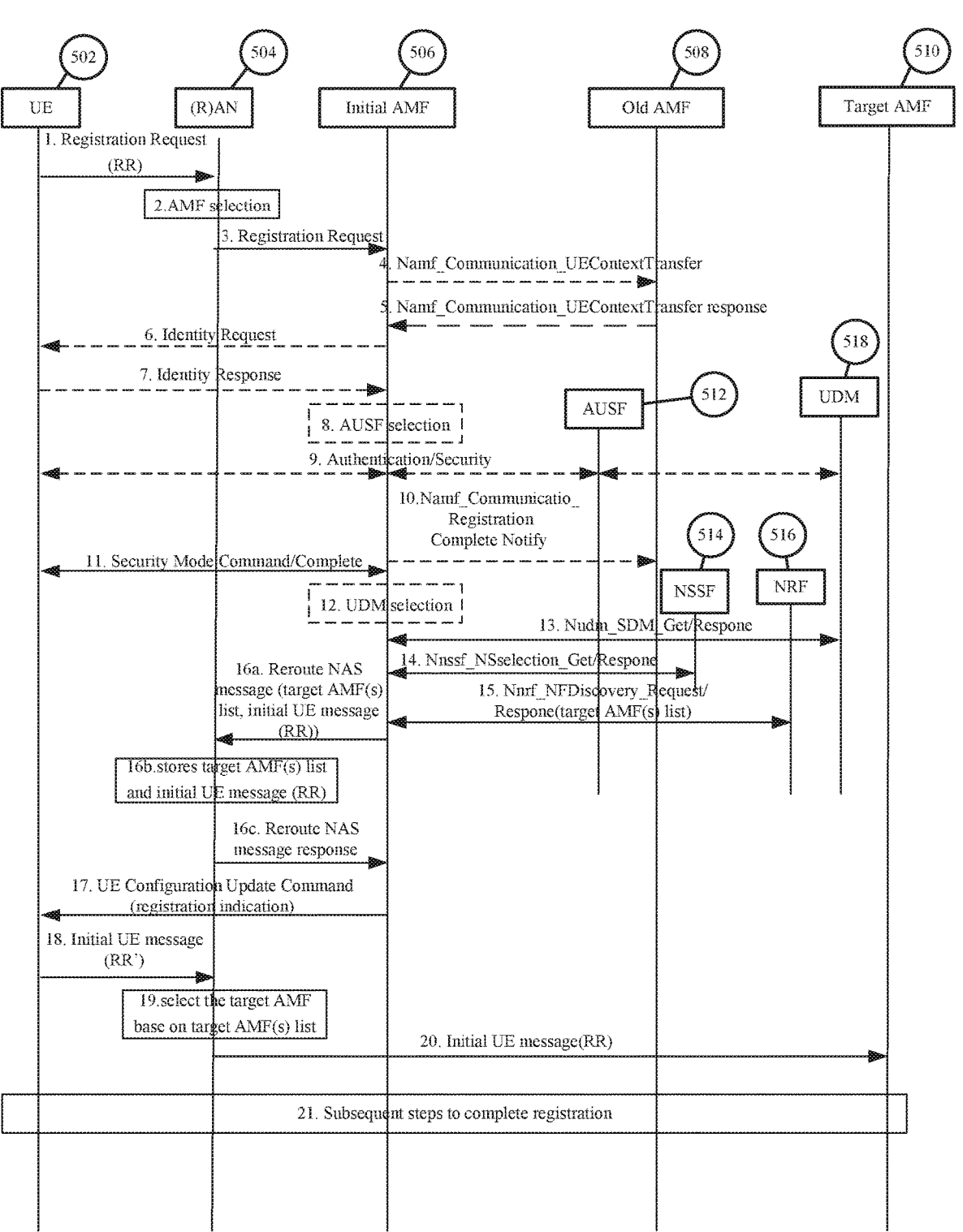
FIG. 5 shows another exemplary logic flow for UE re-allocation from an initial AMF to a target AMF.

FIG. 5 shows another exemplary logic flows for perform-ing secure re-allocation of the UE to the target AMF. The specific exemplary steps are illustrated by steps 1 to 21 in FIG. 5. Various embodiments may include any portion or all of the steps.

In some embodiments, the UE 502 may be UE 402 in FIG. 4. In some embodiments, any of initial AMF 506, old AMF 508, and target AMF 510 may be the corresponding AMF as shown in FIG. 4. In some embodiments, the AUSF 512 may be AUSF 412 in FIG. 4. In some embodiments, the NSSF 514 may be NSSF 414 in FIG. 4. In some embodiments, the NRF 516 may be NRF 416 in FIG. 4. In some embodiments, the UDM 518 may be UDM 418 in FIG. 4.

In some embodiments, steps 1-15 in FIG. 5 may be the same as steps 1-15 in FIG. 4, respectively. In some embodi-ments, the same principle of steps 1-15 in FIG. 4 may be applied to steps 1-15 in FIG. 5. Detailed description of steps 1-15 in FIG. 5 is skipped herein.

In this embodiment, the initial AMF sends the rerouting message to the (R)AN, carrying the target AMF list and the initial UE message carrying either the initial Registration Request from step 1 of FIG. 5, or the full Registration Request from step 9 of FIG. 5. The (R)AN stores the AMF list and the initial or full Registration Request (denoted as RR).

The initial AMF sends the UE Configuration Update Command message to the UE, carrying the registration indication.

The UE initiates a new registration (carrying a new Registration Request, denoted as RR') procedure to the (R)AN. The (R)AN selects the target AMF base on the stored target AMF(s) list and sends an initial UE message (carrying RR) to the target AMF.

The details are described below.

Step 16a

The initial AMF 506, based on local policy and UE subscription information, decides to forward the NAS mes-sage to the target AMF 510 via (R)AN 504. The initial AMF sends a Reroute NAS message to the (R)AN. The Reroute NAS message may include the candidate AMF list. The Reroute NAS message may further include the information about the target AMF. In some embodiments, if step 1 of FIG. 5 has NAS security protection, the Reroute NAS message may include the Registration Request message sent from the UE in step 1 of FIG. 5. In some embodiments, if step 1 of FIG. 5 does not have NAS security protection, the Reroute NAS message may include the full Registration Request message sent from the UE to the AMF in step 9 of FIG. 5.

Step 16b

The (R)AN stores the candidate AMF list and the full Registration Request message. These stored information may be referenced when the (R)AN processes subsequent incoming messages, which may include message sent from the UE.

Step 16c

The (R)AN sends Reroute NAS message Response to the initial AMF.

Step 17

The initial AMF 506 sends a message to the UE with registration indication for requesting the UE to start a registration procedure. The message may include a UE Configuration Update Command message, a Registration Accept message with registration indication, or a Registra-tion reject message. There is no limitation in this disclosure on what type of message may be used to request the UE to start the registration procedure.

Step 18

Triggered by the message sent in step 17, The UE initiates a new Registration procedure, for example, by sending an Initial UE message with a new Registration Request to the (R)AN.

Step 19

The (R)AN selects the target AMF 510 base on the candidate AMF list that the (R)AN stores in step 16b. In some embodiments, the selection may be based on pre-defined rules, for example, connectivity to the candidate AMF may be considered. The selection may also be based on capability of the candidate AMF. There is no limitation in this disclosure on how the target AMF is selected in this disclosure.

Step 20

The (R)AN sends the initial UE message to the target AMF 510 based on the full Registration Request message that the (R)AN stores in step 16b. In this embodiment, the (R)AN chooses to send the Registration Request message as seen in step 16b, rather than the new Registration Request as seen in step 18.

Step 21

After receiving the Registration Request message, the target AMF and the UE continues with the Registration procedure and complete the registration.

In the embodiments above, to perform secure re-alloca-tion of a UE from an initial AMF to a target AMF, proce-dures for UE authentication/registration with the core net-work (e.g., AMF) are disclosed. The Access Network element stores the target AMF list, and optionally, the original Registration Request message from the UE. The initial AMF, once determines an AMF re-allocation is needed, instruct the UE to re-start the registration procedure with the core network. With the solutions provided in this disclosure, the message interactions between the UE and the target AMF are integrity protected, without the need to upgrade the UE and without using an indirect connection of the core network.

The accompanying drawings and description above pro-vide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for performing secure re-allocation of a User Equipment (UE) from an initial core network element to a target core network element in a communication network, performed by an access network element, the method comprising:
receiving, from the UE, a third initial UE message indicative of registration request, the third initial UE message being used for requesting registration with the initial core network element;
receiving a first message comprising a candidate core network element list from the initial core network element, the candidate core network element list comprising the target core network element;
storing the candidate core network element list and the third initial UE message;
transmitting, to the initial core network element, a response message to the first message;
receiving, from the UE, a first initial UE message indicative of registration request, the first initial UE message being and being used for requesting registration with the target core network element;
selecting the target core network element from the candidate core network element list; and
transmitting a second initial UE message indicative of registration request to the target core network element, wherein the second initial UE message is based on the third initial UE message and triggers a registration procedure between the UE and the target core network element.

2. The method of claim 1, wherein before receiving the first initial UE message, the method further comprises:
transmitting, by the initial core network element to the UE, a second message indicative of registration; and
in response to receiving the second message, transmitting, by the UE, the first initial UE message to the access network element.

3. The method of claim 2, wherein the second message comprises one of:
a UE configuration update command carrying a registration indication;
a registration accept message carrying a registration indication; or
a registration reject message.

4. The method of claim 1, wherein the access network element comprises one of a gNodeB (gNB), an evolved NodeB (eNB), or a nodeB.

5. The method of claim 1, wherein the initial core network element comprises an Access and Mobility Management Function (AMF).

6. The method of claim 1, wherein the target core network element comprises an AMF.

7. The method of claim 1, wherein the first message comprises a Non Access Stratum (NAS) message.

8. A computer program product comprising a non-transitory computer-readable program medium with computer code stored thereupon, the computer code, when executed by one or more processors, causing the one or more processors to implement a method of claim 1.

9. A network node comprising a memory for storing computer instructions and a processor in communication with the memory, wherein, when the processor executes the computer instructions, the processor is configured to cause the network node to:
receive, from the UE, a third initial UE message indicative of registration request, the third initial UE message being used for requesting registration with the initial core network element;

receive a first message comprising a candidate core network element list from an initial core network element, the candidate core network element list comprising a target core network element;

store the candidate core network element list and the third initial UE message;

transmit, to the initial core network element, a response message to the first message;

receive, from the UE, a first initial UE message indicative of registration request, the first initial UE message being used for requesting registration with the target core network element;

select the target core network element from the candidate core network element list; and transmit a second initial UE message indicative of registration request to the target core network element, wherein the second initial UE message is based on the third initial UE message and triggers a registration procedure between the UE and the target core network element.

\*   \*   \*   \*   \*